E. D. MARTIN.
BUILDING CONSTRUCTION.
APPLICATION FILED JAN. 21, 1909.
Reissued Nov. 19, 1912.
13,488.
2 SHEETS—SHEET 1.
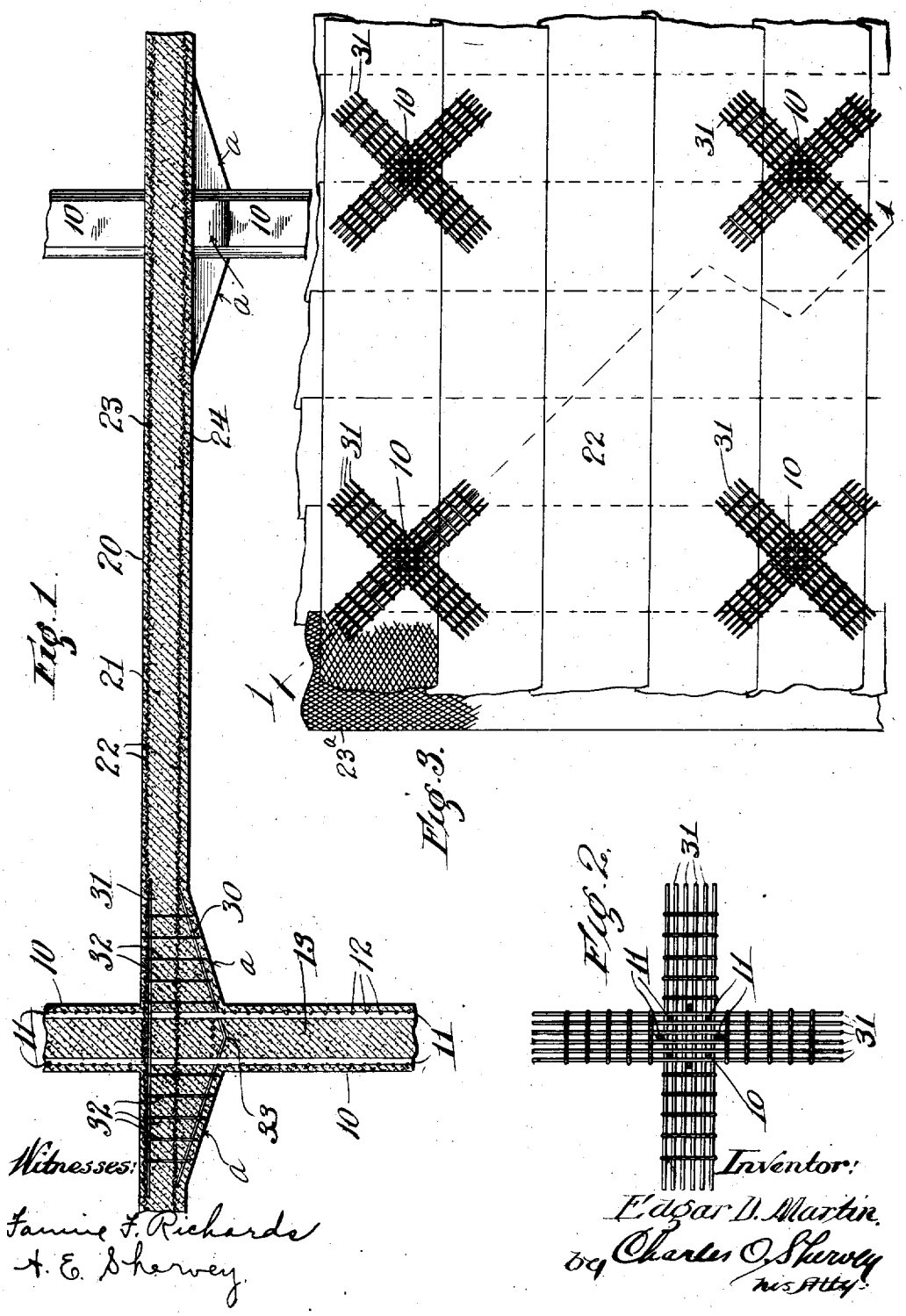

E. D. MARTIN.
BUILDING CONSTRUCTION.
APPLICATION FILED JAN. 21, 1908.
Reissued Nov. 19, 1912.
13,488.
2 SHEETS—SHEET 2.
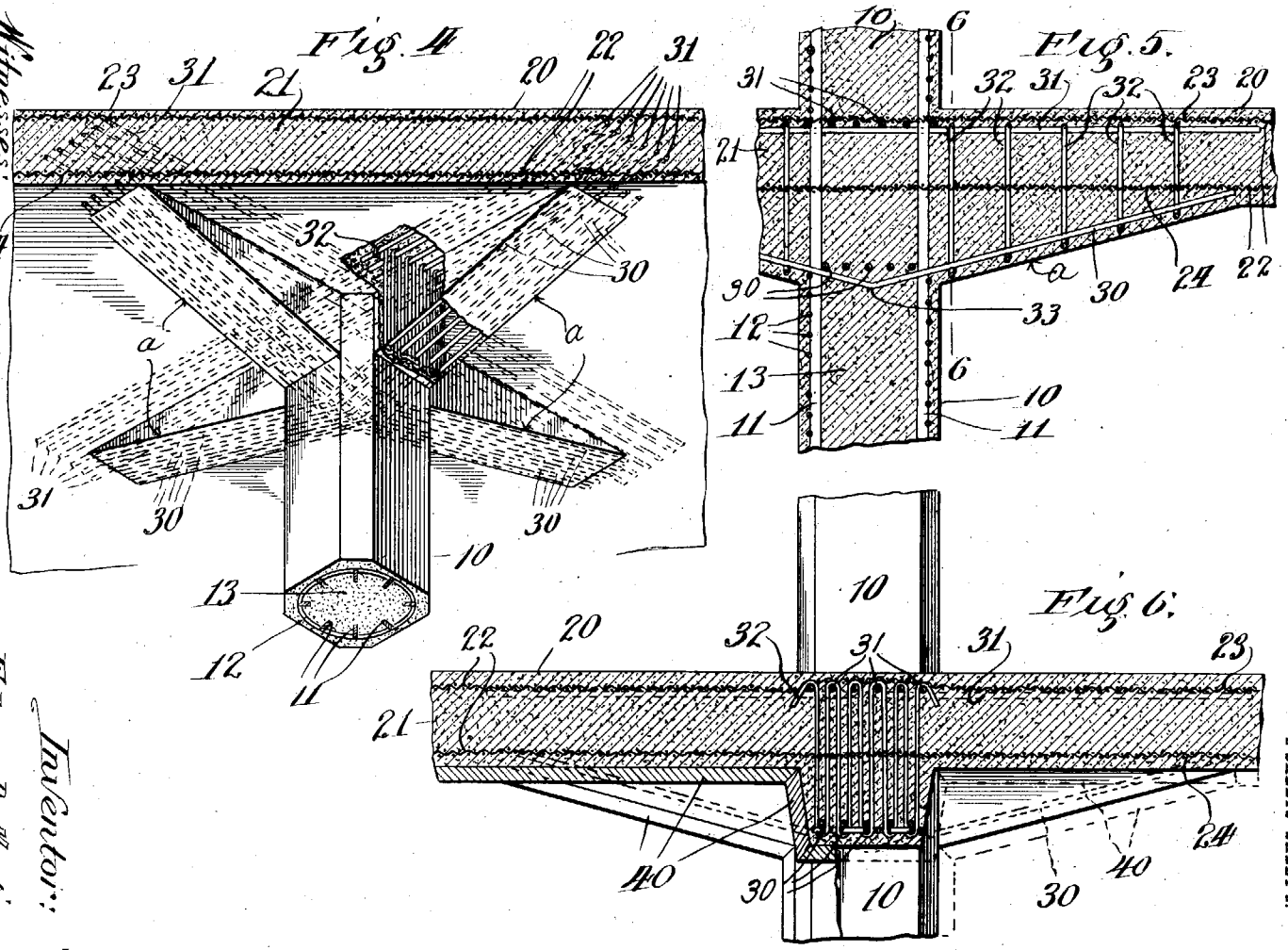
Witnesses:
Fanny F. Richards
A. E. Sherwey
Inventor:
Edgar D. Martin,
by Charles O. Sherwey
his Attg.

UNITED STATES PATENT OFFICE.

EDGAR D. MARTIN, OF CHICAGO, ILLINOIS, ASSIGNOR OF ONE-HALF TO FRANKLIN P. SMITH, OF CHICAGO, ILLINOIS.

BUILDING CONSTRUCTION.

13,488. Specification of Reissued Letters Patent. Reissued Nov. 19, 1912.

Original No. 872,954, dated December 3, 1907, Serial No. 351,048. Application for reissue filed January 21, 1909. Serial No. 473,589.

*To all whom it may concern:*

Be it known that I, EDGAR D. MARTIN, a citizen of the United States, and a resident of Chicago, in the county of Cook and State of Illinois, have invented certain new and useful Improvements in Building Construction, of which the following is a full, clear, and exact description.

My invention relates to certain new and useful improvements in building constructions and more particularly to improvements in building constructions of that class, which are composed of a combination of concrete and reinforcing metal.

One of the objects of this invention is to cheapen the cost of construction of buildings of this class.

Another object is to simplify the construction and erection thereof.

Another object is to increase the strength and durability of the building without necessarily increasing the amount of material.

Another object is to lighten constructions of this class without materially reducing their carrying capacities.

Another object is to provide a structure in which the girders or horizontal supporting beams are dispensed with throughout the entire structure.

To such ends this invention consists in certain novel features of construction and arrangement, a description of which will be found in the following specification, and the essential features of which will be more definitely pointed out in the claims appended hereto.

The invention is clearly illustrated in drawings furnished herewith in which—

Figure 1 is a view partly in vertical section and partly in side elevation of two columns and a fragment of a floor supported thereby, the line of section being indicated at 1—1 in Fig. 3. Fig. 2 is a plan view of the reinforcing metal portions of the cap of one of the columns. Fig. 3 is a diagrammatical plan view, representing four columns and the metal fabric which connects the several columns of the building. Fig. 4 is a fragmental perspective view of a column and floor. Fig. 5 is an enlarged central vertical section through a column and its cap and Fig. 6 is an enlarged detail section taken on the line 6—6 of Fig. 5.

In Fig. 1, 10—10 are two of the columns of a building containing my improved construction. These columns are arranged symmetrically about the building and form the vertical supporting members thereof. As diagrammatically shown in Fig. 3 these columns are preferably arranged to form squares or rectangles and are usually arranged from about 16 to 20 feet apart, although this distance may be varied to suit the requirements. The construction of these columns is immaterial so far as my invention is concerned, but I prefer to make them out of concrete with reinforcing metal therein, and as shown in the drawings, this reinforcing metal consists of vertical bars or rods 11, to which is secured a connecting band of metal 12, which may be wound around the uprights 11 and secured thereby in any suitable manner to make a rigid frame. This frame is embedded in the concrete body 13, of the column, and the uprights 11, extend from top to bottom of the building, the uprights being made in suitable lengths and spliced together in any desirable manner.

The floor is shown at 20 and is supported upon the columns 10. Said floor comprises a concrete body 21, and metal reinforcements 22, the concrete body being united with the concrete body of the columns into one solid integral mass. The metal reinforcements comprise layers of metal fabric 23—24 which may be ordinary wire mesh, expanded metal or other metal fabric. It may be found desirable to use welded fabric of such widths as to cover the span between two adjacent columns, and a very desirable form of metal fabric is one in which the strands are electrically welded together, although the ordinary metal fabric now in commercial use can be used. When ordinary fabric such as wire mesh is used, the strips are laid so as to overlap each other as diagrammatically shown at $23^a$, in Fig. 3, and a second layer of fabric is laid immediately on top of the first layer, at right angles thereto and in close contact therewith. This metal fabric may extend across the entire building if desired, and becomes embedded in the concrete when the construction is completed and the adjacent overlapping edges become tied together by the surrounding concrete, the effect being that the fabric acts as a single or united reinforcement extending substantially over the entire floor space so that strain from a load applied at any point will be transmitted by the fabric in every horizontal direction toward the columns and the load will therefore be more uniformly distributed. At a suitable distance above the reinforcement 24, is secured a second layer of reinforcement 23, which may be of the same construction as the reinforcement which forms the lower layer 24. Both of the reinforcements extend across the columns and become rigidly secured thereto when the concrete is added to complete the floor.

In order to properly support and carry a girderless floor, I have provided widely spreading caps at the heads of the columns—that is at the places where they intersect the floor plates, which caps are constructed and arranged to prevent the floor from shearing down and tearing loose from the columns. The term "widely spreading cap" is used not to indicate, strictly speaking, a column cap, but describes rather an integral projection below the floor slab solely at the points where my experiments have shown the stresses to be greatest. A simple form of widely spreading cap is illustrated in the drawings furnished herewith and as shown therein the cap comprises a number of radially extending arms *a*, which project out quite a considerable distance from the column. In the form shown, reinforcing brace rods 30, are employed which extend transversely through the columns and incline upward from the column. Their middle points are located somewhat below the lower face of the floor while their ends are preferably arranged so as to project up beyond the lower edge of the floor. An upper series of reinforcing rods 31, are preferably arranged near the upper face of the floor and are placed adjacent to the upper layer of the metal fabric 23. The upper series of rods and fabric adjacent thereto act as a metal reinforcement to carry the tensile strains of the upper part of the floor at and about the columns, whereas the lower rods act as braces or brackets to reinforce the arms *a*. The rods 30, 31, are preferably connected and spaced apart by means of stirrups 32, one form of which is shown as comprising a bar of metal bent upon itself to form loops extending between the rods 30, 31, as clearly illustrated in Fig. 6. The stirrups are employed to resist shearing strains which occur at points adjacent to the columns. It is of great importance that the metal parts of these constructions be separated from each other in order that the concrete may completely surround each individual member of the metal reinforcing parts so as to insure safety of the device, and the stirrups shown are very effective for this purpose. The rods are preferably arranged in sets of five or six rods in each set, and placed at right angles to each other as indicated in Fig. 2, although this arrangement of the rods is not essential to my invention, as they may be arranged in other suitable ways, as may be found desirable.

The construction thus formed provides an integral body comprising the columns, widely spreading caps and floor slab which are reinforced by metal reinforcements that are placed in such positions that they will effectively transmit the strains over a wide space. By this construction a floor may be safely carried by the columns without the use of girders or like supports.

In erecting a building containing my improved construction, the frames of the columns for the first floor are first put in place. Wooden molds or centers 40, are then secured in place immediately below the floor to be made, said centers or molds being supported upon trestles or the like. In general, this mold forms a flat surface extending across the entire building except at the columns, where the centers are shaped to conform to the contour of the cap or bracket of the columns. Suitable molds are also provided for the columns and when these are put in place, (after the metal reinforcements have been put in place,) the columns may be completed, by filling the column molds with concrete and ramming it in place. After the centers 40, have been placed in position, the brace rods 30, and stirrups 32, are put in position, the rods 30, being placed above the molds and a layer of concrete is then spread upon the centers or molds. The fabric 24, is then laid upon this layer of concrete, which fabric as above stated, is laid across the columns from end to end of the building, and if this fabric is composed of narrow strips, a second layer is laid directly thereon and at right angles to the first layer, as shown in Fig. 3. The uprights 11, of the columns and the stirrups 32, pass through the fabric thus connecting the latter to the columns. Concrete is then filled in upon the fabric up to within an inch or two of the upper face of the floor and then the cap rods 31, are placed in position in the stirrups and the fabric 23, is placed upon the body of concrete. Another layer of concrete is then filled in on top of the second layer or tier of fabric and the construction of the floor is complete. The frames for the columns on the floors above may be put in place during the work on the floors, or, if desired, they may be put in place before the floor is completed. As soon as the concrete has set, the centers and molds may be removed and used in erecting that part of the building above the floor so constructed.

In the ordinary construction of reinforced concrete buildings, it is customary to employ metal girders such as I beams and the like to support the floors, the girders being hung upon the columns or uprights of the construction. These girders not only are very heavy and add to the weight of the building, but form ridges upon the lower face of the floor, that is to say, upon the ceiling of the room below, which ridges oftentimes mar the scheme of ornamentation, and when it is desired to use the building as a warehouse, they are in the way of the goods or wares in case it is desired to fill up the entire space between the floor and ceiling.

In my construction, I have entirely dispensed with girders of any form, either of metal or of reinforced concrete and have not, by so dispensing with the girders, endangered the stability or the load carrying property of the structure. This I accomplish by employing a plurality of layers of light metal reinforcements, at least one of which covers the entire floor space of the building and which metal reinforcement is completely embedded in concrete, the entire composition of concrete and metal of columns, caps and floor being united into one solid integral mass. It will be noticed that by employing a metal fabric which extends over the entire area bounded by the columns, that when a load is applied to it at any point upon the floor, the strain will be distributed in every horizontal direction, and the strain will thereby be more evenly distributed over all of the supporting means of the construction, and will not have to be carried by one or a few of the ordinary supporting means.

I find that in constructing a girderless floor, a saving of from 30 to 40 per cent. can be had, for the reason that a great share of the cost in erecting a building of this class, is in the preparation and use of the forms and centers.

I find that by dispensing with the molds or forms for the girders, this saving can be had, which saving is of course of great importance in large constructions.

I am aware that various alterations and modifications in the arrangement and form of the parts may be had without departing from the spirit of my invention, and I do not desire, therefore, to limit myself to the exact construction shown and described.

I claim as new and desire to secure by Letters Patent:

1. In a girderless floor construction, the combination with suitable columns, of rods supported therein and extending transversely therefrom, a metal fabric extending over the entire area bounded by the columns and resting upon and connected with said rods and columns, a second metal fabric extending over the entire area bounded by the columns and arranged above the first fabric and a body of concrete in which said fabric and rods are wholly embedded.

2. In a building construction, the combination with suitable columns, of diagonally disposed brace rods supported therein, a layer of metal fabric resting upon said brace rods, a second series of rods arranged above the first series, stirrups connecting and separating said rods, a second layer of metal fabric resting upon said second series of rods and a body of concrete in which said parts are wholly embedded.

3. In a building construction, the combination with suitable columns, comprising uprights and metal connecting bands, of caps for said columns comprising diagonal brace rods, horizontal cap rods and connecting stirrups, a floor comprising two layers of metal fabric resting upon and connected to said brace rods and cap rods and a body of concrete in which the metal parts of said columns, caps and floor are wholly embedded.

4. In a building construction, the combination with metal reinforced concrete columns, of a series of brace rods that extend transversely through said columns and incline upwardly therefrom, a second series of rods extending transversely through said columns thereabove, stirrups connecting said series and spacing the rods apart, a metal reinforced, flat plate floor slab into which said second series of rods project, said floor slab being carried by said columns, and having downwardly projecting bodies of concrete at the columns, formed integral with the columns and floor slabs and having the projecting portions of the first named rods embedded therein.

5. In a building construction, the combination with suitable columns of caps therefor containing two series of transversely extending rods and spacing stirrups, and a floor construction comprising substantially a plurality of layers of metal fabric, each layer resting upon one of said series of rods and a body of concrete in which all of said metal parts are wholly embedded.

6. In a building construction, the combination with a column containing a metal framework having suitable uprights therein, of a series of brace rods, supported in said columns, a series of cap rods above said brace rods, stirrups connecting and separating said rods, two layers of metal fabric resting upon said rods and having the uprights extending therethrough and a body of concrete in which all of said metal parts are wholly embedded.

7. In a building construction, the combination with suitable columns, of brace rods supported therein, cap rods arranged above said brace rods, stirrups of serpentine form connecting and spacing said rods apart, two layers of metal fabric supported upon said rods and a body of concrete in which all of said metal parts are wholly embedded.

8. In a building construction, the combination with suitable columns, of a plurality of suitably separated reinforcement rods located over the heads of the columns, and extending into the floor, layers of overlapping strips of metal reinforcing fabric extending over the heads of the columns, and throughout the entire area of the floor bounded by the columns, and a flat body of concrete in which said metal reinforcements are wholly embedded.

9. In a building construction, the combination with metal reinforced concrete columns, of a concrete flat plate floor slab extending from column to column, widely spreading compression resisting bodies in the angles between the columns and lower face of the floor slab for resisting compression stresses at the columns, said bodies being formed integral therewith, independent upper metal reinforcements for the floor slab located over the heads of the columns and extending through the columns and into the floor slab and a lower metal reinforcement for the floor slab having cross-wise laid strain-resisting elements arranged uniformly throughout its entirety, which strain resisting elements extend throughout the area of the floor slab and are embedded therein and transmit stress from all points of loading in any horizontal direction.

10. In a building construction, the combination with metal reinforced concrete columns, of a concrete flat plate floor slab extending from column to column and having integral, downwardly extending concrete projections arranged adjacent to and surrounding the columns and adapted to resist compression stresses at the columns, a layer of metal reinforcements embedded in the floor slab and arranged adjacent to the lower face thereof and having cross-wise laid tensile members arranged uniformly throughout its entirety and extending throughout the area of the floor slab bounded by the columns and additional metal reinforcements over the heads of the columns and extending through the columns and into the floor slab near its upper face.

11. In a building construction, the combination with columns, each comprising a body of concrete and metal reinforcements embedded therein, of a concrete flat plate floor slab carried by said columns intermediate their ends, downwardly projecting concrete compression resisting bodies formed integral therewith at the columns for resisting the compression stresses of the floor at points adjacent the columns, metal reinforcements located over the heads of the columns and extending through the columns and into the floor slab near its upper face and a metal reinforcement embedded in the floor slab and having cross-wise laid tensile members arranged uniformly throughout its entirety, said metal reinforcement being arranged adjacent to the lower face of the floor slab throughout the area of the floor space bounded by the columns.

12. In a building construction, the combination with columns, a flat plate floor slab extending from column to column and of uniform cross section in its main portion and formed with downwardly thickened compression resisting portions at the columns which are formed integral with the floor slab and columns, a metal reinforcement embedded in said floor slab and comprising cross-wise laid strain-resisting elements arranged uniformly throughout its entirety, and extending throughout the area of the floor space bounded by the columns, upper reinforcement rods extending through the columns and projecting into the floor slab above said metal reinforcement and reinforcement rods in said downwardly thickened portions.

13. In a building construction, the combination with supporting columns, of a concrete flat plate floor slab extending from column to column intermediate their ends, a metal reinforcement comprising cross-wise laid strain-resisting elements arranged uniformly throughout its entirety and extending throughout the entire area of the floor slab and additional widely spreading metal reinforcements located above the cross-wise laid strain-resisting elements and over the heads of the supporting columns and extending into the floor slab.

14. In a building construction, the combination with supporting columns, of a concrete flat plate floor slab extending from column to column, a plurality of downwardly projecting widely spreading compression resisting concrete arms that form a substantial part of the body of the floor slab and radiate from said columns, said arms being formed integral with the columns and floor slab, metal reinforcements in said arms that are angularly disposed with respect to the plane of the floor slab, a metal reinforcement embedded in the floor slab and extending throughout the area of the same, said reinforcement comprising cross-wise laid strain-resisting elements throughout its entirety and additional widely spreading metal reinforcements located above said arms and extending into the floor slab.

15. In a building construction, the combination with metal reinforced concrete supporting columns, of a concrete flat plate floor slab extending from column to column intermediate their ends, downwardly projecting metal reinforced concrete arms that form a substantial part of the floor slab and radiate from said columns, said arms being formed integral with the columns and floor slab, metal reinforcements in said arms that are angularly disposed with respect to the plane of the floor slab, a metal reinforcement extending throughout the area of the floor slab and comprising cross-wise laid metal reinforcement members throughout its entirety and additional widely spreading metal reinforcements located above said arms and extending through said columns and into the floor slab.

16. In a building construction, the combination with metal reinforced concrete columns, of a flat plate floor slab extending from column to column, widely spreading column caps in the angles between the columns and lower face of the floor slab and formed integral therewith, upper metal reinforcements for the floor located over the heads of the columns and extending into the floor slab and lower metal reinforcements for the floor slab which extend throughout the area of the floor slab and comprise two series of parallel, overlapping strips of wire fabric, the strips in each series extending at right angles to the other.

17. In a building construction, the combination with metal reinforced concrete columns, of a concrete flat plate floor slab extending from column to column, a plurality of widely spreading concrete arms which radiate out from the columns and merge into the lower face of the floor, said arms being formed integral with the columns and floor, upper metal reinforcements for the floor located over the heads of the columns and extending into the floor slab near its upper face and lower metal reinforcements for the floor comprising two series of parallel strain-resisting elements embedded in the concrete, the strain-resisting elements of each series being arranged at an angle to each other throughout the area of the floor slab.

In witness whereof, I have executed the above application for Letters Patent of the United States, at Chicago, county of Cook and State of Illinois, this 16th day of January A. D. 1909.

EDGAR D. MARTIN.

Witnesses:

CHARLES O. SHERVEY,
FANNIE F. RICHARDS.